United States Patent Office 3,637,568
Patented Jan. 25, 1972

---

3,637,568
SYNTHETIC RESIN MOLDING COMPOSITIONS CONTAINING N-ALKYLGLUCONAMIDES
Koichi Sato, Osaka, Norifusa Tamugi, Kawasaki, and Katsutoshi Abe, Ikeda, Japan, assignors to Fujisawa Pharmaceutical Co., Ltd., Osaka, Japan
No Drawing. Filed Mar. 23, 1970, Ser. No. 22,035
Claims priority, application Japan, Mar. 24, 1969, 44/22,209
Int. Cl. C08f 45/44; C08g 51/44
U.S. Cl. 260—32.6    6 Claims

ABSTRACT OF THE DISCLOSURE

Use of N-alkylgluconamides of the formula:

R—NHCO(CHOH)$_4$CH$_2$OH wherein R is an alkyl group having 1 to 24 carbon atoms as an additive for molding synthetic resins, especially as a lubricant for thermoplastic resin, a releasing agent for thermosetting resin, and an antistatic agent for both resins, and resinous compositions for molding containing the said N-alkylgluconamide.

---

The present invention relates to a novel additive useful for molding synthetic resins, and particularly to an additive capable of bringing about excellent effects in molding thermoplastic resins.

Hitherto, it is well known that, in the operation of molding of thermoplastic resins, e.g. polyvinyl chloride, poly(acrylonitrile-butadiene-styrene) (hereinafter referred to as ABS resin), and the like, a lubricant is employed for the purpose of increasing the fluidity of resins to make easy its workability and improving the finishing of molds. As such a lubricant there are known, for example, stearic acid, stearic amide, zinc stearate, lead stearate, barium stearate, cadmium stearate, stearyl alcohol, and the like. However, some of them have not enough lubricating effects and others have not satisfactory compatibility with resins, they can not be, therefore, necessarily satisfied.

An object of the present invention is to provide a novel additive useful for molding synthetic resins having excellent properties.

Another object of the invention is to provide a lubricant useful for molding synthetic resins having excellent properties.

Further object of the invention is to provide a lubricant capable of increasing the fluidity of resins to elevate their workability and improving the finishing of molds.

More further object of the invention is to provide a lubricant which has excellent compatibility with synthetic resins and can improve the thermostability of resins.

Still further object of the invention is to provide a synthetic resin composition containing the said additive.

Other objects of the invention will be apparent from the following disclosure.

The above-mentioned objects have now been accomplished by the use of N-alkylgluconamides as an additive for molding synthetic resins; the said N-alkylgluconamides being represented by the general formula:

R—NHCO(CHOH)$_4$CH$_2$OH wherein R is an alkyl group having 1 to 24 carbon atoms.

The said N-alkylgluconamides have the following advantages in comparison with conventional lubricants of aliphatic acid amide type, such as stearic amide. They have an excellent effect for improving the thermostability of resins, excellent lubricating effect, excellent compatibility with synthetic resins, and have large permissibility to be blended with other additives. Therefore, in case they are mixed with thermoplastic resins, e.g. polyvinyl chloride, ABS resin, and the like in the molding of them, the fluidity of resins is extremely smooth; the occurrence of heat by friction within a molding machine is very few; the period to a constant torque is shorter; the temperature of resins in a constant state is lower; the period to the decomposition point of resins is longer; the softening point-dropping ratio of resins is smaller; resinous composition containing the additive is preferably applied for vacuum forming because of its excellent expansibility; and the releasing of mold after molding is very good. By the use of the novel additive in carrying out the molding of thermoplastic resins, hence, the fluidity of resins can be increased and their workability can be elevated, and further the finishing of molds can be improved; that is, the obtained molds have smooth surface without any fish eye or die line, and have good glossiness and clearness. To be interested, the additive gives antistatic property to synthetic resins.

The additive of the present invention can be added not only to thermoplastic resins but also to thermosetting resins. By the addition of the additive to thermosetting resins, the releasing of molds after curing can be extremely improved. The obtained molds have excellent glossiness, and their colored articles have profound color. Of course, they have good antistatic property. The application of the additive to thermosetting resins is carried out by adding the additive to precondensates of thermosetting resins and then curing the composition thus obtained. In that case, the additive may also behave as a curing accelerator.

Therefore, the additive of the present invention can be employed as a lubricant for thermoplastic resin, a releasing agent for thermosetting resin, and an antistatic agent for both resins.

The additive employed in the invention is N-alkylgluconamides represented by the general formula:

R—NHCO(CHOH)$_4$CH$_2$OH

In the above general formula R is an alkyl group having 1 to 24 carbon atoms, being straight or branched. In case of the alkyl group having extremely smaller carbon atoms it tends to decrease the fluidity of resins; and in case of extremely larger carbon atoms it tends to decrease the compatibility of the additive and resins. Therefore, the number of the carbon atom is preferably 8 to 20, especially 12 to 18.

N-alkylgluconamides in which carbon numbers of the alkyl group are 8, 10, 12, 14, 16 and 18 have been already known by the description in "The Journal of the American Oil Chemist Society," Vol. 29, pages 202–7 (1952), but the others are novel compounds. All of the novel compounds may be prepared by the same manner as described in the literature. As examples of N-alkylgluconamides there are N-ethylgluconamide, N-propylgluconamide, N-butylgluconamide, N-pentylgluconamide, N-hexylgluconamide, N-heptylgluconamide, N-octylgluconamide, N-nonylgluconamide, N-decylgluconamide, N-undecylgluconamide, N-dodecylgluconamide, N-tridecylgluconamide, N-tetradecylgluconamide, N-pentadecylgluconamide, N-hexadecylgluconamide, N-heptadecylgluconamide, N-octadecylgluconamide, N-nonadecylgluconamide, N-eicosylgluconamide, N-heneicosylgluconamide, N-decosylgluconamide, and N-tricosylgluconamide.

On the other hand, as the synthetic resin there are thermoplastic resins and thermosetting resins. Examples of the said thermoplastic resin are polyvinyl chloride, polyvinylidene chloride, polystyrene, poly(acrylonitrile-styrene), poly(acrylonitrile-butadiene), ABS resin, acryllic resin, methacrylic resin, polyethylene, polypropylene, poly(ethylene-propylene), poly(ethylene-vinyl acetate), polyfluorocarbon, polyamide, polycarbonate, and the like.

Examples of the said thermosetting resin are phenolic resin, urea resin, melamine resin, guanamine resin, and the like.

In the addition of the N-alkylgluconamides to these synthetic resins there may be optionally employed one or more kinds of the N-alkylgluconamide. The ratio to be combined is varied with kinds of resins and means for molding; and it is generally selected from the range of 0.01 to 20% by weight to the resin employed, preferably 0.1 to 10% by weight.

As a means for molding the resinous composition in which N-alkylgluconamide is combined, there may be employed conventional methods, e.g. extrusion, injection molding, compression molding, and the like. In these cases, to the resinous composition there may be optionally added various other additives such as plasticizer, stabilizer, coloring agent, filler, and releasing agent. Furthermore, conventional lubricants may be optionally added.

The following examples serve to illustrate the various embodiments of the present invention. In examples, all of "parts" mean "parts by weight."

EXAMPLE 1

Each composition shown in Table 1 was kneaded by a mixing roll at 180° C. for 2 minutes, introduced into the piston part of a Koka flow tester and then heated. When the temperature was elevated to 200° C., the nozzle-sluice of the flow tester was opened to measure the downward travel of plunger.

The detailed explanation of Koka flow tester is described in Teikichi Arai's "A Guide to the Testing of Rheological Properties with Koka Flow Tester" published by Maruzen Co., Ltd. (1958).

The test results are shown in Table 1.

TABLE 1

| Composition (part) | Second | | | | | | |
|---|---|---|---|---|---|---|---|
| | 1 | 5 | 10 | 15 | 20 | 25 | 30 |
| Example 1.......... ABS resin (50), N-stearyl-gluconamide* (1), mm. | 0.8 | 1.5 | 2.7 | 3.9 | 5.4 | 7.4 | 12.1 |
| Control 1.......... ABS resin, mm........... | 0.7 | 1.0 | 1.3 | 1.7 | 2.2 | 3.0 | 4.1 |
| Control 2.......... ABS resin (50), stearic amide (1), mm. | 0.7 | 1.1 | 1.8 | 2.5 | 3.3 | 4.4 | 6.0 |

*A kind of N-octadecylgluconamide.

EXAMPLE 2

Each composition shown in Table 2 was kneaded by a mixing roll at 170° C. for 2 minutes and treated in the same manner as described in Example 1, and then the downward travel of plunger was measured.

The test results are shown in Table 2.

TABLE 2

| Composition (part) | Second | | | | | | |
|---|---|---|---|---|---|---|---|
| | 4 | 20 | 40 | 60 | 80 | 100 | 120 |
| Example 2.......... Polymethyl methacrylate (100), N-stearyl-gluconamide (1.5), mm. | 0.4 | 0.8 | 1.6 | 2.9 | 4.9 | 7.2 | 10.3 |
| Control 3.......... Polymethyl methacrylate, mm. | 0.3 | 0.4 | 0.8 | 1.5 | 2.7 | 4.5 | 6.4 |

EXAMPLE 3

The procedure in Example 1 was repeated except that each composition shown in Table 3 was employed instead of the compositions shown in Table 1.

The test results are shown in Table 3.

TABLE 3

| Composition (part) | Second | | | |
|---|---|---|---|---|
| | 1 | 2 | 3 | 4 |
| Example 3.... Polyvinyl chloride (50), dioctyl phthalate (25), cadmium stearate (0.25), lead stearate (0.25), N-stearylgluconamide (1), mm.................. | [1] 15 | | | |
| Control 4..... Polyvinyl chloride (50), dioctyl phthalate (25), cadmium stearate (0.25), lead stearate (0.25), mm................................................. | 3.4 | 7.0 | 10.4 | 13.7 |

[1] After 0.2 second.

EXAMPLE 4

100 parts of polyvinyl chloride, 2.5 parts of dibutyl-tin-maleate and 1.0 part of dibutyl-tin-laurate were mixed by a mixer at 100° C. for 10 minutes, and then the resultant composition was cooled and taken out of the mixer. To the compositions was combined one part of N-stearylgluconamide. Thus obtained composition was plastographed to give each test results shown in Table 4.

The test condition in plastography is as follows:

Capacity: 50 cc.
Rotation: 50 r.p.m.
Temperature: 180° C.
Pre-heating: 2 minutes (and then immediately the test was started)

Besides, as Control 5 the procedure in Example 4 was repeated except that the use of N-stearylgluconamide was omitted.

The test results are shown in Table 4.

TABLE 4

| | Torque (kg.-m.) | | Temp. of resin (° C.) | | Tc (min.) | QMc (° C.) | MB (kg.-m.) |
|---|---|---|---|---|---|---|---|
| | 3 min. | 5 min. | 3 min. | 5 min. | | | |
| Example 4 | 3.32 | 2.90 | 170 | 189 | 6.0 | 186.0 | 5.83 |
| Control 5 | 3.50 | 3.03 | 186 | 195 | 9.5 | 202.0 | 8.55 |

Note.—Tc=Period (min.) which resin reaches to constant torque value; QMc=Temperature (° C.) in constant state; $M_B$=Maximum torque (kg.-m.).

EXAMPLE 5

100 parts of polyvinyl chloride, 2.5 parts of dibutyl-tin-maleate and 1.0 part of dibutyl-tin-laurate were mixed by a mixer at 100° C. for 10 minutes. The mixture was cooled and taken out of the mixer. To the resultant mixture were uniformly combined 0.5 part of N-stearylgluconamide and 0.5 part of butyl stearate being an already known lubricant. Thus obtained composition was plastographed to give each test result shown in Table 5.

As Control 6 the procedure in Example 5 was repeated except that the use of N-stearylgluconamide was omitted.

As Control 7 the procedure in Example 5 was repeated except that 0.5 part of butyl stearate was employed instead of N-stearylgluconamide.

The test results are shown in Table 5.

TABLE 5

| | $T_D$ (min.) | $M_B$ (kg.-m.) |
|---|---|---|
| Example 5 | 17.0 | 6.60 |
| Control 6 | 11.5 | 9.05 |
| Control 7 | 13.5 | 8.80 |

Note.—$T_D$=Period (min.) which resin reaches to its decomposition point.

From the results in the above-mentioned examples, it is understood that the molding compositions of thermoplastic resin, containing the lubricant of the invention, have large downward travel of plunger, low torque and good fluidity. Besides, they have short period which resins reach to their constant torque; low temperature in their constant state; and long period which resins reach to their decomposition point.

EXAMPLE 6

100 parts of polyvinyl chloride, 15 parts of dioctyl phthalate, 1.5 parts of cadmium stearate and 1.5 parts of lead stearate were mixed at 80° C. by a Henschel mixer and then cooled. To the resultant composition was added each N-alkylgluconamide of which alkyl group is as shown in Table 6. Thus obtained resinous composition was plastographed to know the influence to thermostability, torque in compression and gellation period by the lubricants employed.

The test condition in plastography is as follows:

Rotation: 30 r.p.m.
Temperature: 190° C.
Pre-heating: 3 minutes
Sample: 55 g.

TABLE 6

| Alkyl group (carbon number) | $C_2$ | $C_5$ | $C_8$ | $C_{12}$ | $C_{18}$ |
|---|---|---|---|---|---|
| Thermostability: | | | | | |
| $T_F$ | ± | ++ | ++ | ++ | ++ |
| $Q_F$ | ++ | ++ | ++ | ++ | ++ |
| $T_F-T_E$ | ++ | ++ | ++ | ++ | +++ |
| $T_F-T_D$ | ± | ++ | ++ | ++ | +++ |
| Torque in compression: | | | | | |
| $M_D$ | − | ± | + | + | +++ |
| $M_E$ | − | ± | + | ++ | +++ |
| Gellation period, $T_D$ | ± | + | + | ++ | ++ |

Note.—$T_F$=Period which resin is decomposed; $Q_F$=Decomposition temperature; $T_E$=Period which resin reaches to constant state; $T_D$=Period which resin reaches to gellation state; $M_D$=Torque in gellation state; $M_E$=Torque in constant state; − =Inferior to blank test; ± =No change; + to +++=Superior to blank test.

EXAMPLE 7

100 parts of polyvinyl chloride, 50 parts of dioctyl phthalate, 0.5 part of cadmium stearate, 0.5 part of zinc stearate and 1.0 or 1.5 parts of N-stearylgluconamide were kneaded at 165 to 170° C. by a mixing roll, and then subjected to compression molding at 170° to 180° C. to give a film.

As a control the procedure in Example 7 was repeated except that ethylene-bis-stearoamide was employed instead of N-stearylgluconamide.

The tensile strength and the rate of elongation of these films were measured. The tensile velocity was 200 mm./min.

The test results are shown in Table 7.

TABLE 7

| | Tensile strength (kg./mm.²) | Rate of elogation (percent) |
|---|---|---|
| N-stearylgluconamide, part: | | |
| 0 | 1.95 | 283 |
| 1.0 | 2.25 | 280 |
| 1.5 | 2.26 | 293 |
| Ethylene-bis-stearoamide, part: | | |
| 1.0 | 2.03 | 258 |
| 1.5 | 1.89 | 273 |

EXAMPLE 8

100 parts of polyvinyl chloride, 50 parts of dioctyl phthalate, 1.0 part of cadmium stearate, 1.5 parts of barium stearate and 0.5 part of N-stearylgluconamide were kneaded and then molded to give a plate.

As a Control the procedure in Example 8 was repeated except that ethylene-bis-stearoamide was employed instead of N-stearylgluconamide.

The specific resistances on surface of the plates thus obtained are shown in Table 8.

Table 8

SPECIFIC RESISTANCE (OHMS)

| | |
|---|---|
| Example 8 | $3.7 \times 10^{13}$ |
| Control | $2.1 \times 10^{15}$ |
| Blank | $2.8 \times 10^{15}$ |

EXAMPLE 9

The films obtained in Example 7 and control thereof were impressed by high voltage, and their antistatic property was measured based on decreasing of the charge value. The measurement was carried out in an air-conditioned room maintained at 20° C. and 72% RH.

The test results are shown in Table 9.

TABLE 9

| | Minute | | | | |
|---|---|---|---|---|---|
| | 0 | 30 | 60 | 120 | 180 |
| Example 9, kv | 8.00 | 1.04 | 0 | | |
| Control, kv | 7.60 | 5.72 | 4.52 | 3.02 | 2.17 |
| Blank, kv | 7.00 | 5.30 | 4.19 | 2.68 | 1.66 |

In Examples 10 to 16 there are shown several recipes of molding compositions of synthetic resins, containing N-stearylgluconamide of the invention.

EXAMPLE 10

| | Parts |
|---|---|
| Polyvinyl chloride | 100 |
| Dioctyl phthalate | 35 |
| Epoxy resin | 5 |
| Cadmium stearate | 0.5 |
| Barium stearate | 0.5 |
| N-stearylgluconamide | 1 |
| Phenyl salicylate | 0.5 |

They were uniformly mixed to give a resinous composition.

EXAMPLE 11

| | Parts |
|---|---|
| Polyethylene | 100 |
| N-Decylgluconamide | 0.5 |
| Titanium oxide | 2 |
| Strontium chromate | 0.5 |

EXAMPLE 12

They were uniformly mixed to give a resinous composition.

| | Parts |
|---|---|
| N-hexadecylgluconamide | 0.3 |
| Polystyrene | 100 |

They were uniformly mixed to give a resinous composition.

EXAMPLE 13

| | Parts |
|---|---|
| ABS resin | 100 |
| N-tetradecylgluconamide | 2 |
| Talc | 10 |
| Strontium chromate | 0.5 |

They were uniformly mixed to give a resinous composition.

EXAMPLE 14

| | Parts |
|---|---|
| Polyvinylidene chloride | 100 |
| Di-isooctyl phthalate | 40 |
| N-dodecylgluconamide | 1.5 |
| Phenyl salicylate | 0.5 |

They were uniformly mixed to give a resinous composition.

EXAMPLE 15

| | Parts |
|---|---|
| Polyvinyl chloride | 100 |
| Dibutyl-tin-mercaptide | 2 |
| Cadmium stearate | 0.5 |
| N-(2-ethylhexyl)gluconamide | 1.5 |
| Titanium oxide | 5 |
| Strontium chromate | 0.5 |

They were uniformly mixed to give a resinous composition.

EXAMPLE 16

| | Parts |
|---|---|
| Poly(methyl methacrylate) | 100 |
| N-nonylgluconamide | 2 |

They were uniformly mixed to give a resinous composition.

EXAMPLE 17

70 parts of pre-condensate from urea and formaldehyde and 30 parts of pulp were mixed, dried, and then crushed to give compounds. To the compounds were combined 0.05 part of acidic curing agent and optional amounts of N-stearylgluconamide. The resultant was treated by a Koka flow tester having 0.5 mm. $\phi$ nozzle to measure its flow velocity (cm.$^3$/sec.).

As a control the procedure in Example 17 was repeated except that stearic acid was employed instead of N-stearylgluconamide.

The test results are shown in Table 10.

TABLE 10

| Amounts of N-stearyl-gluconamide (part): | Flow velocity (cm.$^3$/sec.) |
|---|---|
| 0 | 0.213 |
| 0.2 | 0.245 |
| 0.5 | 0.393 |
| 1.0 | 0.488 |
| 2.0 | 0.619 |
| Addition of stearic acid (0.4 part) | 0.315 |

NOTE.—Weight: 200 kg./cm.$^2$ Temp.: 130° C.

EXAMPLE 18

The ureaformaldehyde resins obtained in Example 17 were subjected to bending strength test. The test was carried out according to the provision of JIS K 6,911.

Temperature: 20° C.
Bending velocity: 0.5 mm./min.

The test results are shown in Table 11.

TABLE 11

| Amounts of N-stearyl-gluconamide (part): | Bending strength (kg./mm.$^2$) |
|---|---|
| 0 | 11.930 |
| 0.5 | 9.670 |
| 1.0 | 8.650 |
| Addition of stearic acid (0.4 part) | 7.410 |

EXAMPLE 19

A mixture of 1 mole of melamine, 2.8 moles of 37% formalin (pH 8) and hexamethylenetetramine (5% by weight to the amounts of melamine) were heated at 80° C. for 30 minutes to give a precondensate.

60 parts of the pre-condensate and 40 parts of pulp were mixed, dried, and then crushed to result in compounds.

To the compounds was combined N-stearyl-gluconamide (0.5 or 1.0% by weight to the amounts of melamine).

To know the fluidity of the resultant composition, it was compressed between two plates which surfaces were plated with chromium, at 170° C. under 50 kg./cm.$^2$ for 1 minute to give disks.

As a control the procedure in Example 19 was repeated except that a mixture of zinc stearate (1% by weight to the amounts of melamine) and aluminum stearate (1% by weight to the amounts of melamine) was employed instead of N-stearylgluconamide.

The diameter of glossy area and the bending strength of the disks were measured.

The test results were shown in Table 12.

TABLE 12

| | N-stearyl-gluconamide, percent | Diameter Major axis (cm.) | Diameter Minor axis (cm.) | Bending strength (kg./mm.$^2$) |
|---|---|---|---|---|
| Example 19 | 0.5 | 7.30 | 6.65 | 9.85 |
| | 1.0 | 7.35 | 7.10 | 9.40 |
| Control | | 6.85 | 6.65 | 9.10 |

EXAMPLE 20

A phenol-formaldehyde resin having the following recipe was molded.

| | Parts |
|---|---|
| Pre-condensate | 70 |
| Pulp | 30 |
| N-stearylgluconamide | 1 |
| Pigment (black) | Several amounts |

As a control the procedure in Example 20 was repeated except that one part of zinc stearate was employed instead of N-stearylgluconamide.

The test results are shown in Table 13.

TABLE 13

| | Water content (percent) | Rate of shrinking by molding (percent) | Insulation resistance (meg. ohm) |
|---|---|---|---|
| N-stearylgluconamide | 0.7 | 0.67 | $7.5 \times 10^5$ |
| Zinc stearate | 0.8 | 0.64 | $1.1 \times 10^6$ |

In the preparation of the shaped article containing N-stearylgluconamide, the gas-escaping and the releasing are of no problem. The surface of the article has excellent glossiness and no clouding.

EXAMPLE 21

A phenol-formaldehyde resin having the following recipe was molded.

|  | Parts |
|---|---|
| Pre-condensate | 47.5 |
| Pulp | 48.5 |
| Curing agent | 2.5 |
| N-stearylgluconamide | 1.0 |
| Coloring agent | Several amounts |

EXAMPLE 22

A melamine-formaldehyde resin having the following recipe was molded.

|  | Parts |
|---|---|
| Pre-condensate | 60 |
| Pulp | 35 |
| Zinc stearate | 0.6 |
| N-stearylgluconamide | 0.4 |
| Coloring agent | Several amounts |

What we claim is:

1. A resinous composition for molding which essentially comprises at least one thermosetting resin and an N-alkylgluconamide represented by the general formula:

$$R-NHCO(CHOH)_4CH_2OH$$

wherein R is an alkyl group having from 1 to 24 carbon atoms.

2. A composition as defined in claim 1 in which R is an alkyl group having from 8 to 20 carbon atoms.

3. A composition as defined in claim 1 in which R is an alkyl group having from 12 to 18 carbon atoms.

4. A composition as defined in claim 1 in which the N-alkylgluconamide is N-octadecylgluconamide.

5. A composition as defined in claim 1 in which the N-alkylgluconamide is employed in the ratio of from 0.01 to 20 parts by weight to 100 parts by weight of the thermosetting resin.

6. A composition as defined in claim 1 in which the thermosetting resin is selected from the group consisting of phenolic resin, urea resin, melamine resin and guanamine resin.

References Cited

UNITED STATES PATENTS

| 2,662,073 | 12/1953 | Mehltretter | 260—561 B |
| 2,729,860 | 1/1956 | Balkin | 260—Antistatic Dig. |
| 2,923,738 | 2/1960 | Williams | 260—Antistatic Dig. |
| 2,958,665 | 11/1960 | Stefcik | 20—Antistatic Dig. |
| 3,386,871 | 6/1968 | Dulin | 260—32.6 |

FOREIGN PATENTS 809,060   2/1959   Great Britain.

MORRIS LIEBMAN, Primary Examiner

P. R. MICHL, Assistant Examiner

U.S. Cl. X.R.

260—32.6 A, 32.6 N, 32.6 PQ, 561 B, Dig. 15